United States Patent
Noldus et al.

(10) Patent No.: US 9,313,168 B2
(45) Date of Patent: Apr. 12, 2016

(54) METHOD AND SERVER ENTITY FOR FORWARDING A MESSAGE CONTAINING A HOST NAME OR DOMAIN NAME IN AN INTERNET BASED COMMUNICATIONS NETWORK

(75) Inventors: Rogier August Caspar Joseph Noldus, Goirle (NL); Jos Den Hartog, Capelle A/d Ijssel (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 948 days.

(21) Appl. No.: 13/376,229

(22) PCT Filed: Jun. 12, 2009

(86) PCT No.: PCT/EP2009/057314
§ 371 (c)(1),
(2), (4) Date: Jan. 5, 2012

(87) PCT Pub. No.: WO2010/142349
PCT Pub. Date: Dec. 16, 2010

(65) Prior Publication Data
US 2012/0173742 A1 Jul. 5, 2012

(51) Int. Cl.
*G06F 15/16* (2006.01)
*H04L 29/12* (2006.01)
*H04L 29/06* (2006.01)

(52) U.S. Cl.
CPC ...... *H04L 61/1552* (2013.01); *H04L 29/12132* (2013.01); *H04L 65/105* (2013.01); *H04L 65/1006* (2013.01); *H04L 65/1016* (2013.01)

(58) Field of Classification Search
USPC .................. 709/228, 249, 245, 250
See application file for complete search history.

(56) References Cited

U.S. PATENT DOCUMENTS

| | | | |
|---|---|---|---|
| 7,929,419 B2 * | 4/2011 | Sprague | 370/218 |
| 2006/0129665 A1 | 6/2006 | Toebes et al. | |
| 2008/0212569 A1 * | 9/2008 | Terrill et al. | 370/352 |
| 2010/0103927 A1 * | 4/2010 | Bakker | 370/352 |
| 2010/0125673 A1 * | 5/2010 | Richardson et al. | 709/239 |
| 2012/0243547 A1 * | 9/2012 | Pardo-Blazquez et al. | 370/401 |

FOREIGN PATENT DOCUMENTS

| | | |
|---|---|---|
| JP | 2007189540 A | 7/2007 |
| WO | 0209387 A1 | 1/2002 |
| WO | 2006075323 A2 | 7/2006 |

OTHER PUBLICATIONS

"Uniform Resource Locators (URL)." Request for Comments: 1738. Dec. 1994. The Internet Society, Reston, VA.
(Continued)

*Primary Examiner* — Lan-Dai T Truong
(74) *Attorney, Agent, or Firm* — Coats & Bennett, P.L.L.C.

(57) ABSTRACT

Method and server entity for forwarding a message containing a host name or domain name in an interne based communications network from a User Agent (UA) to the communications network or vice versa. The method comprises the steps of querying, by a proxy entity, a Domain Name Server (DNS) for obtaining from the Domain Name Server an Internet Protocol (IP) address associated with the host name or domain name, and including the Internet Protocol address in the message prior to forwarding the message to the communications network or User Agent, respectively, by the proxy entity.

12 Claims, 3 Drawing Sheets

(56) References Cited

OTHER PUBLICATIONS

"SIP: Session Initiation Protocol." Request for Comments: 3261. Jun. 2002. The Internet Society, Reston, VA.

3GPP. "Technical Specification Group Core Network and Terminals; IP multimedia call control protocol based on Session Initiation Protocol (SIP) and Session Description Protocol (SDP); Stage 3 (Release 8)." 3GPP TS 24.229 V8.7.0. Mar. 2009. 3GPP, Sophia Antipolis, France.

* cited by examiner

METHOD AND SERVER ENTITY FOR FORWARDING A MESSAGE CONTAINING A HOST NAME OR DOMAIN NAME IN AN INTERNET BASED COMMUNICATIONS NETWORK

TECHNICAL FIELD

The invention relates to a method of forwarding a message containing a host name or domain name in an internet based communications network from a user agent to the communications network or vice versa via a proxy entity.

Such message containing a host name or domain name may be used for allowing the receiver of the message, i.e. the user agent or the communications network, to contact the host associated with said host name or domain name.

BACKGROUND

Such method may for instance be used in Session Initiation Protocol (SIP) signaling to/from a SIP User Agent (UA). A SIP UA may send SIP requests to an Internet Protocol (IP) Multimedia Subsystem (IMS) network and may receive SIP responses from the IMS network. These SIP requests and responses may be exchanged during SIP session establishment, during an established SIP session and for non-session related SIP message exchange.

A SIP message, i.e. a SIP request or a SIP response, may contain various headers. These headers may be used for SIP message routing or for application handling. Certain SIP headers may contain a host name or a domain name. The UA may, when receiving such host name or domain name in the SIP message, have to use this host name or domain name for processing the message.

Examples of a host name in a SIP message are:
Alert-Info: <http://www.provider.com/sounds/ringtone1245.wav>

The Alert-Info header may be used as pointer to a ring tone in a SIP Invite request or as a pointer to a ring-back tone in a SIP180 Ringing response on the Invite request.

Call-Info:<http://www.provider.com/johnny/picture.jpg>
;purpose=icon,

The Call-info provides additional information about the calling party to the called party (in the case that the Call-info header is included in a SIP request) or provides additional information about the called party to the calling party (in the case that the Call-info header is included in a SIP response).

When a SIP UA receives a message including a host name and wants to process the message, the UA may have to apply Domain Name Server (DNS) name resolving on the host name. For example, when a SIP UA receives a SIP Invite including the Alert-info header as depicted in the above example, then the UA has to contact DNS in order to resolve www.provider.com into an Internet Protocol (IP) address, so it can access that host, using HyperText Transfer Protocol (HTTP), for obtaining the ring tone from that host (/sounds/ringtone1245.wav).

DNS name resolving by the user agent (UA) may lead to delay in accessing the host associated with the host name or domain name in the message. The UA would have to send a DNS query message, or several DNS query messages, to its DNS (i.e. the entry into global DNS, as available to this UA) and receive a DNS response message, the response message containing an IP address associated with the host name or domain name contained in the DNS query message. Delay may be aggravated by the user agent having limited bandwidth access to the internet.

SUMMARY

It is an object of the present invention to optimize the Domain Name Server (DNS) name resolving for situations as described above. More in general, it is an object of the invention to improve the method of forwarding a message containing a host name or domain name in an internet based communications network from a user agent to the communications network or vice versa via a proxy entity.

Thereto, according to the invention is provided a method of forwarding a message containing a host name or domain name in an internet based communications network from a User Agent (UA) to the communications network or vice versa via a proxy entity, the method comprising the steps of querying, by the proxy entity, a Domain Name Server (DNS) for obtaining from the Domain Name Server (DNS) an Internet Protocol (IP) address associated with the host name or domain name, and including the Internet Protocol (IP) address in the message prior to forwarding the message to the communications network or User Agent (UA), respectively, by the proxy entity. The proxy entity may send multiple DNS query messages for obtaining the IP address.

This provides the advantage that DNS name resolving need not be performed by the user agent or the communications network, which may lead to faster call set up time and improved network performance. Hence, the message received by the user agent already contains the IP address associated with the domain name or host name. Thus, upon receipt of the message, the user agent need not contact DNS any more, so that is saved on communications time and (radio) access network resources, and can immediately contact the host of which the IP address is contained in the message. The proxy entity generally will have higher bandwidth access to the internet than the user agent. Hence, the proxy entity can perform DNS name resolving faster than the user agent.

Preferably, including the Internet Protocol (IP) address in the message comprises replacing the host name or domain name with the Internet Protocol (IP) address in the message. Hence, the length of the message need not be unduly increased. Rather, the length of the message is more likely to be decreased. An Internet Protocol version 4 (IPv4) address occupies no more than 15 bytes. A host name or domain name may be much longer than that.

According to one aspect of the invention the message is a Session Initiation Protocol (SIP) message, the communications network is an Internet Protocol (IP) Multimedia Subsystem (IMS) telecommunications network, and the proxy entity is a Proxy Call Session Control Function (P-CSCF) entity or an Access Session Border Gateway (A-SBG). Hence, according to this aspect of the invention may be provided a method for forwarding a Session Initiation Protocol (SIP) message containing a host name or domain name in an Internet Protocol (IP) Multimedia Subsystem (IMS) telecommunications network from a User Agent (UA) to the Internet Protocol (IP) Multimedia Subsystem (IMS) telecommunications network or vice versa via a Proxy Call Session Control Function (P-CSCF) entity, wherein the method comprises querying, by the Proxy Call Session Control Function (P-CSCF) entity, a Domain Name Server (DNS) for obtaining from the Domain Name Server (DNS) an Internet Protocol (IP) address associated with the host name or domain name, and including the Internet Protocol (IP) address in the Session Initiation Protocol (SIP) message prior to forwarding the Session Initiation Protocol (SIP) message to the Internet Protocol (IP) Multimedia Subsystem (IMS) telecommunications network or User Agent (UA), respectively, by the Proxy Call Session Control Function (P-CSCF) entity.

Optionally the proxy entity comprises a repository for storing the host name or domain name and associated Internet Protocol (IP) address retrieved from the Domain Name Server (DNS).

It is a further option that the method further comprises forwarding a further message containing a host name or domain name from a User Agent (UA) to the communications network or vice versa via the proxy entity, wherein the proxy entity determines whether or not the host name or domain name contained in the further message is stored in the repository, and when said host name or domain name is stored in the repository the proxy entity retrieves the Internet Protocol (IP) address associated therewith from the repository, or when said host name or domain name is not stored in the repository the proxy entity queries a Domain Name Server (DNS) for obtaining from the Domain Name Server (DNS) an Internet Protocol (IP) address associated with said host name or domain name, and including the Internet Protocol (IP) address associated therewith in the message prior to forwarding the message to the communications network or User Agent (UA), respectively, by the proxy entity. This provides the advantage that an IP address associated with a host name or domain name need not be retrieved from DNS if it has been retrieved from DNS before by that proxy entity.

Optionally the method further comprises selecting, by the proxy entity, the Domain Name Server (DNS) from a plurality of Domain Name Servers, e.g. on the basis of a rule or policy. Such rule or policy can e.g. be a preference of the User Agent, a preference of a service provider, a preference of a network provider, etc.

Optionally the method further comprises, when the Domain Name Server (DNS) returns a plurality of Internet Protocol (IP) addresses associated with the host name or domain name, selecting, by the proxy entity the Internet Protocol (IP) address to be included in the message. The Internet Protocol (IP) address to be included may be selected on the basis of information available to the proxy entity on network topology. The proxy entity may e.g. comprise information on a physical location of servers (hosts) associated with certain IP addresses and/or bandwidths in network paths to certain IP addresses. The proxy entity may select the IP address to be included in the message to optimize performance, e.g. to reduce delay times. Additionally, or alternatively, the IP address to be included may be selected on the basis of a rule or policy, such as a preference of the User Agent, a preference of a service provider, a preference of a network provider, etc.

It is a further option, that the method may further comprise modifying, by the proxy entity, the Internet Protocol (IP) address retrieved from the Domain Name Server (DNS) prior to including the Internet Protocol (IP) address in the message. Thus, it is possible to redirect the User Agent or communications network to a modified IP address (e.g. when the User Agent would use the Alert-Info to obtain a ring tone). Such modified IP address may e.g. be determined on the basis of a rule or policy. It is for instance possible to replace the IP address associated with the domain name "provider.com" with the IP address associated with the domain name "provider.nl" if such rule is set to redirect to a local domain if possible. Removing the IP address from the message, e.g. because the associated host or domain is considered forbidden by a rule or policy, may also be considered as modifying the IP address herein. It is also possible that the host name or domain name is removed from the message and not replaced by the associated IP address.

Optionally, the message is a Session Initiation Protocol (SIP) request or SIP response.

Optionally, the message comprises an alert-info header or a call-info header.

The invention also relates to a proxy entity for receiving a message containing a host name or domain name in an internet based communications network from a User Agent (UA) or the communications network, and for forwarding the message to the communications network or user agent (UA), respectively, wherein the proxy entity is arranged for querying a Domain Name Server (DNS) for obtaining from the Domain Name Server (DNS) an Internet Protocol (IP) address associated with the host name or domain name, and for including the Internet Protocol (IP) address in the message prior to forwarding the message.

The method also relates to a terminal device in an Internet based communications network for receiving a message forwarded by a server entity, wherein the terminal device is arranged for selecting and communicating to the network whether or not a message relating to a host name or domain name sent to the terminal device is to contain the host name or domain name or an Internet Protocol address associated with the host name or domain name. Thus, the terminal device may instruct the proxy entity to obtain from the Domain Name Server an Internet Protocol address associated with the host name or domain name and to include the Internet Protocol address in a message prior to forwarding the message to the terminal device.

BRIEF DESCRIPTION OF THE DRAWINGS

The invention will now be further elucidated by means of non-limiting examples referring to the drawing, in which.

DETAILED DESCRIPTION

Figure 1:
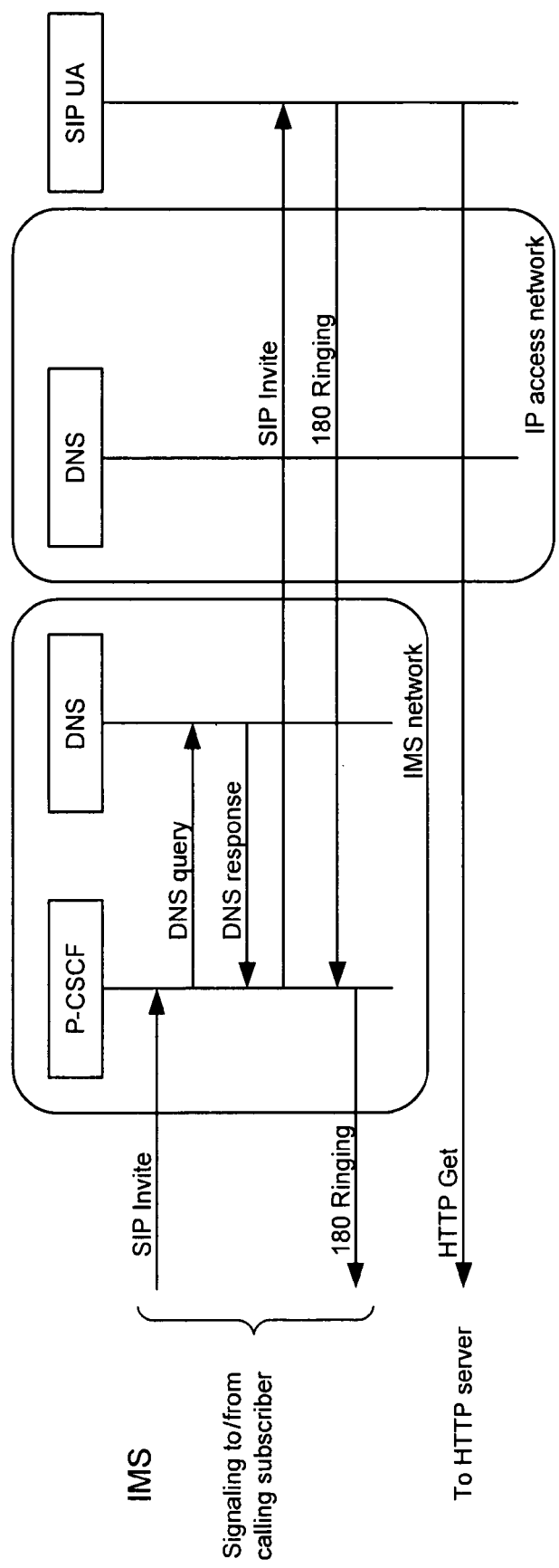
FIG. 1 shows an example of a schematic representation of the method according to the invention.

An example of the method of the invention is depicted schematically in FIG. 1. In FIG. 1 communication is schematically depicted between an Internet Protocol (IP) Multimedia Subsystem (IMS) telecommunications network, forwarding messages from a calling subscriber, e.g. a calling IMS subscriber, and a Session Initiation Protocol (SIP) User Agent (UA) via a Proxy Call Session Control Function (P-CSCF) entity, also referred to as proxy entity.

Figure 2:
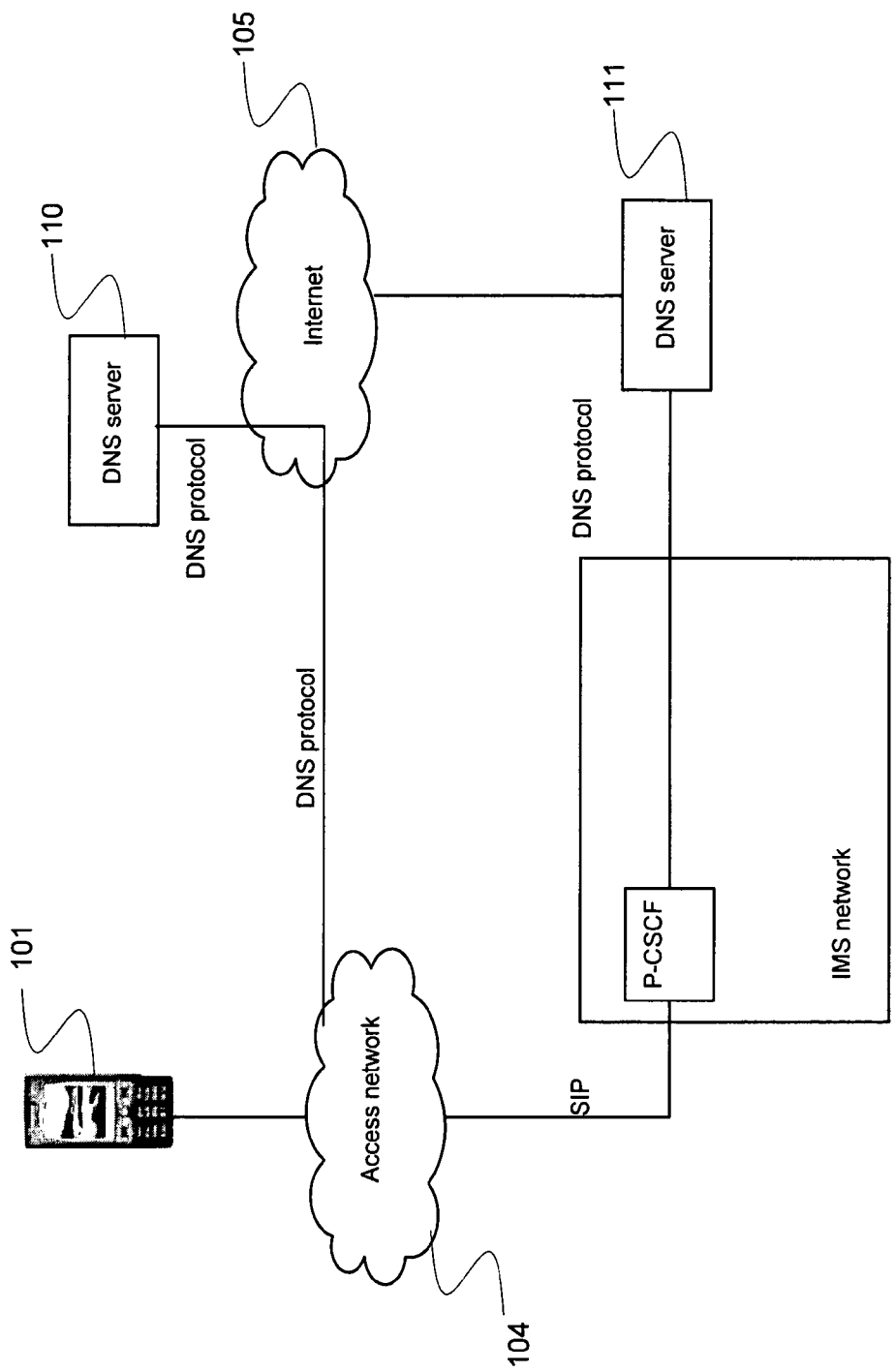
FIG. 2 shows an example of a schematic representation of the system according to the invention.

FIG. 2 shows a schematic representation of a system according to the invention. The User Agent (UA), e.g. a terminal device such as a mobile communications device 101 of a (IMS) subscriber, is communicatively connected to an access network 104, e.g. a wireless Local Area Network (LAN). In this example, the access network 104 is communicatively connected to the proxy entity, e.g. a server, (here the Proxy Call Session Control Function (P-CSCF) entity) and via the proxy entity to the Internet Protocol (IP) Multimedia Subsystem (IMS) network. The proxy entity is in this example communicatively connected to a Domain Name Server 111. In the example of FIG. 2 the mobile communications device 101 is also connected to a further Domain Name Server 110 via the access network 104 and the internet 105. It will be appreciated that such connection may allow direct DNS querying by the User Agent, which, as will become clear, is not required by the method according to the invention.

Figure 3:
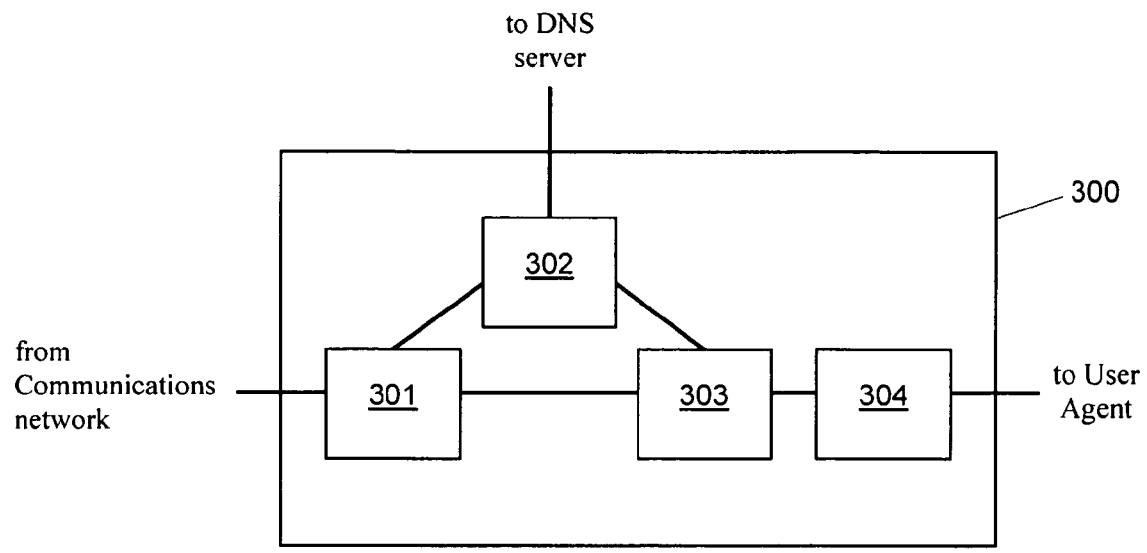
FIG. 3 shows a schematic representation of an example of a proxy entity according to the invention.

FIG. 3 shows a schematic representation of an example of a proxy entity 300 according to the invention. The proxy entity comprises a receiving module 301 for receiving a SIP message containing a host name or domain name. The proxy entity further comprises a DNS querying module 302 for performing a DNS query for retrieving an Internet Protocol (IP) address associated with the host name or domain name. The proxy entity further comprises an including module 303 for including the Internet Protocol (IP) address in the SIP message. The proxy entity further comprises a forwarding module 304 for forwarding the SIP message after having included the IP address into the SIP message.

Returning to FIG. 1 the proxy entity, e.g. the receiving module 301, processes an incoming SIP Invite from the calling (IMS) subscriber. In this example, the SIP Invite contains an Alert-Info header, said header containing a host name for obtaining alert info. The proxy entity, e.g. the DNS querying module 302, performs a Domain Name Server (DNS) query, sending the DNS query to a Domain Name Server 111 associated with the IMS network for obtaining from the DNS an Internet Protocol (IP) address associated with the host name. Each node in the IMS network may have access to a Domain Name Server (DNS) for requesting name resolving. An IMS network, constituting a defined domain within the internet, may have its own DNS. Each Domain Name Server (DNS) may be seen as an entry portal into the global domain name system.

In this example, the proxy entity, e.g. the including module 303, replaces the host name in the Alert-Info in the SIP Invite by the IP address obtained from the Domain Name Server (DNS). The proxy entity, e.g. the forwarding module 304, then forwards the SIP Invite to the SIP User Agent (UA). The SIP User Agent (UA) may now use the IP address in the Alert-Info header to obtain the ring tone, without having to perform DNS query.

For example the Alert-Info header received by the proxy entity may be:

Alert-Info: <http://www.provider.com/sounds/ringtone1245.wav>. The proxy entity may receive the IP address 167.76.32.66 from the Domain Name Server (DNS) as being associated with the host name www.provider.com. The proxy entity may then replace the received Alert-Info header by:

Alert-Info: <http://167.76.32.66/sounds/ringtone1245.wav>.

As can be seen in this example, the host name www.provider.com is replaced by IP address 167.76.32.66. The information that follows the host name, i.e. the string "/sounds/ringtone1245.wav" (the path and file name), is not modified by the proxy entity in this example. A HyperText Transfer Protocol (HTTP) Get command for http://www.provider.com/sounds/ringtone1245.wav will in this example render the same result as an HTTP Get command for http://167.76.32.66/sounds/ringtone1245.wav.

In a more elaborate embodiment, the proxy entity may apply caching for the IP address obtained from the Domain Name Server (DNS). The proxy entity then may comprise a repository, e.g. a cache, for storing the host name or domain name and associated Internet Protocol (IP) address retrieved from the Domain Name Server (DNS). The obtained IP address may have a validity period associated with it, e.g. of 24 hours. Since there may be many IMS subscribers receiving SIP Invite containing an Alert Info header with the same host name, e.g. www.provider.com, caching the IP address may considerably reduce communication traffic between the proxy entity and the Domain Name Server (DNS). Caching in the proxy entity will have the effect that the proxy entity does not need to perform a DNS query for the SIP Invite messages containing a host name or domain name that is already stored in the repository. The proxy entity has the corresponding IP address in the repository and can hence perform the host name to IP address conversion, without having to perform a DNS query (at least for the duration of the IP address validity period).

Thus, such more elaborate method according to the invention may in this example further comprise forwarding a further message containing a host name or domain name from a (for instance further) User Agent (UA) to the Internet Protocol (IP) Multimedia Subsystem (IMS) telecommunications network or vice versa via the Proxy Call Session Control Function (P-CSCF) entity (proxy entity). The proxy entity determines whether or not the host name or domain name contained in the further message is stored in the repository. When said host name or domain name is stored in the repository the proxy entity retrieves the Internet Protocol (IP) address associated therewith from the repository. When said host name or domain name is not stored in the repository the proxy entity queries a Domain Name Server (DNS) for obtaining from the Domain Name Server (DNS) an Internet Protocol (IP) address associated with said host name or domain name. The proxy entity then includes the Internet Protocol (IP) address associated with said host name or domain name in the message prior to forwarding the message to the Internet Protocol (IP) Multimedia Subsystem (IMS) telecommunications network or SIP User Agent (UA).

When the Domain Name Server (DNS) returns multiple IP addresses for a single hostname, the proxy entity can use its knowledge on the network topology to select the most appropriate IP address. The proxy entity may e.g. comprise information on the physical location of servers (hosts) associated with certain IP addresses and/or bandwidths in network paths to certain IP addresses. The proxy entity may select the IP address to be included in the message to optimize performance, e.g. to reduce delay times. Additionally, or alternatively, the IP address to be included may be selected on the basis of a rule or policy, such as a preference of the user agent, a preference of a service provider, a preference of a network provider, etc. The preference of a User Agent could e.g. form part of a subscription profile of the User Agent. Thus, such preference could be sent from a Home Subscriber Server (HSS) to a Serving Call Session Control Function (S-CSCF) entity and/or to a Proxy Call Session Control Function (P-CSCF) entity, e.g. using existing signalling sequences.

It is also possible that a plurality of Domain Name Servers (DNS) are available to the proxy entity. The proxy entity may select one particular Domain Name Server for retrieving the IP address associated with the host name or domain name. This selection may be made on the basis of a rule or policy, such as a preference of the User Agent, a preference of a service provider, a preference of a network provider, etc.

In an elaborate embodiment, the proxy entity may be arranged to modify the Internet Protocol (IP) address retrieved from the Domain Name Server (DNS) prior to including the Internet Protocol (IP) address in the message. Thus, it is possible to redirect the User Agent or communications network to a modified IP address. It is for instance possible to replace the IP address associated with the domain name "provider.com" with the IP address associated with the domain name "provider.nl" if such rule is set to redirect to a local domain if possible. Removing the IP address from the message, e.g. because the associated host or domain is considered forbidden by a rule or policy, may also be considered as modifying the IP address herein.

When the proxy entity (a) selects the Domain Name Server to be used and/or (b) selects the IP address to be used and/or (c) manipulates the SIP message based on the response from the Domain Name Server, the proxy entity can do policy enforcement on the content. E.g. because the operator and/or the government doesn't want certain ring(back) tones to be played.

The above-described method may be applied equally for the Alert-Info header in a SIP Invite as for the Call-Info header in a SIP request or SIP response. The method of the present invention is proposed for Alert-Info header and the Call Info header. The method of the present invention may, however, also be applied to other SIP messages and SIP headers, where applicable. On example of a SIP message where the invention may be applied is SIP Message (request and response).

It will be appreciated that having the proxy entity perform the DNS query, will result in reduced signaling between a SIP User Agent and an access network which connects the User Agent to a Domain Name Server (DNS). This will be an advantage especially when the access network is a wireless network or otherwise has limited bandwidth. When a calling or called party has to obtain information from the internet during call establishment, e.g. Alerting information, then receiving an IP address instead of a host name or domain name will reduce latency in the process of obtaining said information. This may improve user experience.

The proxy entity may apply DNS name resolving for a subscriber for incoming SIP requests and responses, regardless of the IMS network the peer entity belongs to. For example, when the P-CSCF entity applies name resolving for Alert-Info in an incoming SIP Invite, then the name resolving may be applied regardless of the network the calling party (sending the SIP Invite) belongs to.

As described above, the proxy entity can have the capability to perform the translation of a host name or domain name into an IP address.

In one embodiment, this capability is provided unconditionally. When a terminal device is connected via a proxy entity which supports this capability, the capability is always provided. The terminal or subscriber can not influence the selection of a proxy entity.

In another embodiment, this capability to perform the translation of the host name or domain name into the IP address by the proxy entity is provided to specific terminal devices or customers, e.g. based on a subscription option. During registration, a check is done, at the HSS, whether the terminal device and/or subscriber is entitled to use this capability. If so, the P-CSCF entity is instructed that for this terminal device this capability must be used. This instructing by the HSS to the P-CSCF entity, is done through the sending of a designated subscription option, from the HSS to the S-CSCF entity and from the S-CSCF entity to the P-CSCF entity, using existing SIP signaling messages that are used during the registration process. When the P-CSCF entity receives the instruction from the HSS to apply this capability, but the P-CSCF entity does not support this capability, then the P-CSCF entity will apply normal behaviour.

Figure 4:
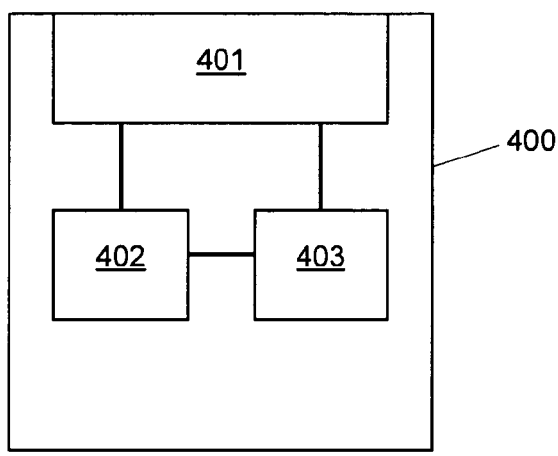
FIG. 4 shows a schematic representation of an example of a terminal device according to the invention.

In a further embodiment, this capability is provided to specific terminal devices or subscribers, on request of the subscriber. During registration, a check is done, at the HSS, whether the terminal device and/or subscriber is entitled to use this capability. If so, the P-CSCF entity is instructed that for this terminal device this capability may be used. During registration, the terminal device may indicate in the Registration request message to the network that it wants to use this capability. FIG. 4 shows a schematic representation of the terminal device 400 according to this embodiment. The terminal device 400 comprises input/output means 401 for communicating with the network, e.g. with the P-CSCF entity. The terminal device further comprises selection means 402 for selecting, by the user of the terminal device, whether or not to use the capability. The selection means 402 are connected to the input/output means 401, for communicating a message representative of the selection whether or not to use the capability to the network at registration. It will be appreciated that the selection means may be implemented in hardware and/or software. The terminal device 400 further comprises a processor for controlling the input/output means 401 and the selection means 402. If the subscriber is entitled to use the capability and the subscriber indicates, by means of the selection means 402 and by submitting a message indicating so to the network, that it wants to use the capability, the P-CSCF entity determines that for this terminal this capability must be used as long as the terminal is registered at this P-CSCF entity, provided that a P-CSCF entity is selected that supports this capability. Optionally, the subscriber indicates, during the Registration request, that it wants to use this capability. The access network (such as the Wideband Code Division Multiple Access (W-CDMA) network) defines which P-CSCF entity will be selected, e.g. by means of a Dynamic Host Configuration Protocol (DHCP). Optionally the terminal device defines which P-CSCF entity will be used by means of a predetermined list of P-CSCF entities comprised in the terminal device and by transmitting an identification of one or more of preferred P-CSCF entities to the network during registration. It will be appreciated that it is also possible that the terminal device signals to the network at another moment than during registration that from a certain moment onwards the capability is to be used.

In the foregoing specification, the invention has been described with reference to specific examples of embodiments of the invention. It will, however, be evident that various modifications and changes may be made therein without departing from the broader spirit and scope of the invention as set forth in the appended claims.

In the example an Alert-Info header is described. The above-described method may be applied equally for the Alert-Info header in a SIP Invite, as for the Call-Info header in a SIP request or SIP response. The method of the present invention is proposed for Alert-Info header and the Call Info header. The method of the present invention may, however, also be applied to other SIP messages and SIP headers, where applicable.

In the example, is referred to an Internet Protocol (IP) Multimedia Subsystem (IMS) telecommunications network. It will be appreciated that the invention may also be practised in other internet based communications networks, such as other voice over internet protocol networks.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method, implemented by a proxy entity, of forwarding a Session Initiation Protocol (SIP) message in an Internet Protocol (IP) Multimedia Subsystem (IMS) telecommunications network from a User Agent (UA) to the communications network or vice versa, the method comprising:
   receiving, at the proxy entity, a SIP message containing a host name or domain name, wherein the proxy entity is a Proxy Call Session Control Function (P-CSCF) entity or an Access Session Border Gateway (A-SBG);
   querying a Domain Name Server (DNS) to obtain, from the DNS, an IP address associated with the host name or domain name contained in the received SIP message; and
   including the IP address in the SIP message prior to the proxy entity forwarding the SIP message to the telecommunications network or UA, respectively; wherein including the IP address in the SIP message comprises replacing the host name or domain name with the IP address in the SIP message.

2. The method of claim 1, wherein the proxy entity comprises a repository for storing the host name or domain name and associated IP address retrieved from the DNS, the method further comprising:
   forwarding an additional message containing a host name or domain name from the UA to the IMS telecommunications network or vice versa;
   determining whether or not the host name or domain name contained in the additional message is stored in the repository;
   responsive to the host name or domain name being stored in the repository, retrieving the IP address associated with the host name or domain name from the repository;
   responsive to the host name or domain name not being stored in the repository, querying the DNS to obtain from the DNS an IP address associated with the host name or domain name; and
   including the IP address associated with the host name or domain name in the message prior to forwarding the message to the IMS telecommunications network or UA.

3. The method of claim 1, further compromising selecting the DNS from a plurality of Domain Name Servers based on a rule or policy.

4. The method of claim 1, further comprising:
   responsive to the DNS returning a plurality of IP addresses associated with the host name or domain name, selecting an IP address to be included in the message based on information available to the proxy entity on network topology, a rule or policy, or a combination thereof.

5. The method of claim 1, further compromising:
   modifying the IP address retrieved from the DNS prior to including the IP address in the message, based on a rule or policy.

6. The method of claim 1, wherein the SIP message is a SIP request or SIP response, and wherein the SIP message includes an alert-info header or a call-info header and the domain name or host name is contained in one or both of these headers.

7. The method of claim 1, wherein the host name or domain name in the SIP message containing a host name or domain name comprises a host name or domain name that is different from a host name or domain name associated with any forwarding of the SIP message by the proxy entity.

8. A server entity corresponding to a Proxy Call Session Control Function (P-CSCF) entity or an Access Session Border Gateway (A-SBG), the server entity comprising:
   a receiving circuit configured to receive a Session Initiation Protocol (SIP) message containing a host name or domain name in an Internet Protocol (IP) Multimedia Subsystem (IMS) telecommunications network from a User Agent (UA) or the telecommunications network;
   a forwarding circuit configured to forward the message to the telecommunications network or User Agent, respectively;
   a querying circuit configured to query a Domain Name Server (DNS) to obtain from the DNS an IP address associated with the host name or domain name; and
   an including circuit configured to include the IP address in the message prior to forwarding the message, wherein including the IP address in the SIP message comprises replacing the host name or domain name with the IP address in the SIP message.

9. The server entity of claim 8, wherein the server entity further comprises:
   a repository for storing the host name or domain name and associated IP address retrieved from the DNS;
   wherein the server entity is configured to:
      forward a further message containing a host name or domain name from the UA to the telecommunications network or vice versa;
      determine whether or not the host name or domain name contained in the further message is stored in the repository; and
      responsive to the host name or domain name being stored in the repository, to retrieve the IP address associated with the host name or domain name from the repository;
   wherein the querying circuit is further configured, responsive to the host name or domain name not being stored in the repository, to query a DNS to obtain from the DNS an IP address associated with the host name or domain name; and
   wherein the including circuit is further configured to include the IP address associated the host name or domain name in the message prior to forwarding the message to the telecommunications network or UA.

10. The server entity of claim 8, wherein the server entity is further configured to:
    select the DNS from a plurality of Domain Name Servers based on a rule or policy; and
    responsive to the DNS returning a plurality of IP addresses associated with the host name or domain name, select the IP address to be included in the message based on information available to the server entity on network topology, a rule or policy, or a combination thereof.

11. The server entity of claim 8, wherein the server entity is further configured to modify the IP address retrieved from the DNS prior to including the IP address in the message based on a rule or policy.

12. The server entity of claim 8, wherein the SIP message is a SIP request or SIP response, and the SIP message includes an alert-info header or a call-info header; and wherein the domain name or host name is contained in one or both of these headers.

* * * * *